United States Patent

[11] 3,581,712

[72] Inventor Robert G. Ferris
 Harvard, Ill.
[21] Appl. No. 17,492
[22] Filed Mar. 9, 1970
[45] Patented June 1, 1971
[73] Assignee Starline, Inc.

[54] SWEEP SHUTTLE FEEDER
 8 Claims, 5 Drawing Figs.
[52] U.S. Cl. .................................................. 119/56,
 119/52, 198/52, 198/87, 198/67, 198/113, 198/218
[51] Int. Cl. ................................................ A01k 05/02,
 A01k 05/00, B65g 47/34, B65g 25/10
[50] Field of Search .............................................. 198/220,
 67, 87, 113, 114, 115, 52, 218; 119/52, 56

[56] References Cited
 UNITED STATES PATENTS
| 712,311 | 10/1902 | Kolp | 198/87 |
| 3,168,188 | 2/1965 | Verban | 198/113 |
| 3,302,770 | 2/1967 | Schwalm | 198/115X |
| 3,366,223 | 1/1968 | Haen | 198/67 |
| 3,403,773 | 10/1968 | Loesch et al. | 198/52 |
| 3,417,882 | 12/1968 | McConnell | 198/113X |
| 3,443,547 | 5/1969 | Ferris et al. | 119/52 |

Primary Examiner—Aldrich F. Medbery
Attorney—Hofgren, Wegner, Allen, Stellman & McCord ABSTRACT: A sweep shuttle animal feeder of the type having a feed trough which reciprocates above a feed bunk that is about twice the length of the trough so that feed deposited into the reciprocating trough from a feed supply station above the midpoint of the bunk may be dropped from the trough along the bunk by the action of two sets of sweep means that are pivoted above the path of travel of the trough with a set on each side of the feed supply station for selectively controlling relative movement between the deposited feed and the trough. The sweep means of the set through which the leading end of the trough is passing at any given time pass over feed in the trough while the sweep means of the set through which the trailing end of the trough is passing at any given time arrest feed in the trough so that it drops off the trailing end. The trough is made up of a plurality of longitudinal sections so articulated to compensate for straightness irregularities in the tracks supporting the trough, with each section being pivotally connected to the adjacent section at the bottom of the trough and also interconnected at the top of the trough for relative longitudinal movement with each section being provided with a pair of trolleys spaced from the joint between trough sections for supporting the same on the track. The motive means for reciprocating the trough along the feed bunk includes a cable extending from each end of the trough outwardly to a power source in a manner that the power source always pulls the trough, regardless of the direction of movement, to eliminate compressive forces on the trough.

PATENTED JUN 1 1971
3,581,712
SHEET 1 OF 3
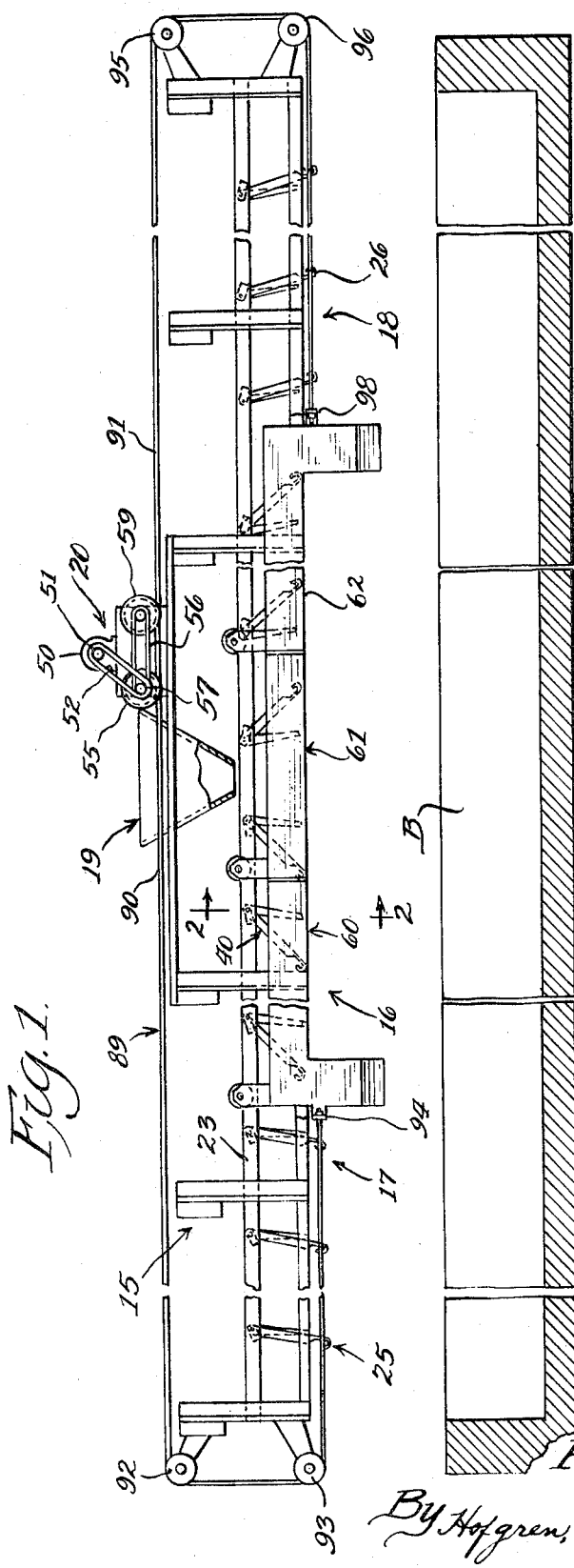
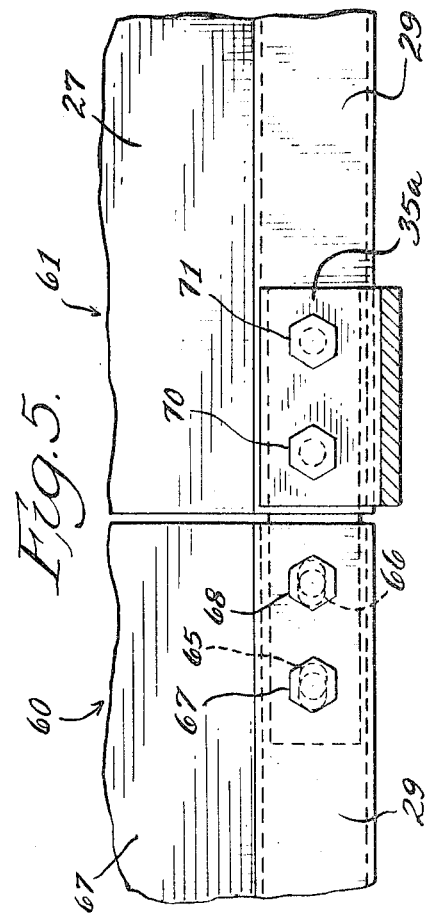
Inventor
Robert G. Ferris
By Hofgren, Wegner, Allen, Stellman & McCord
Attys.

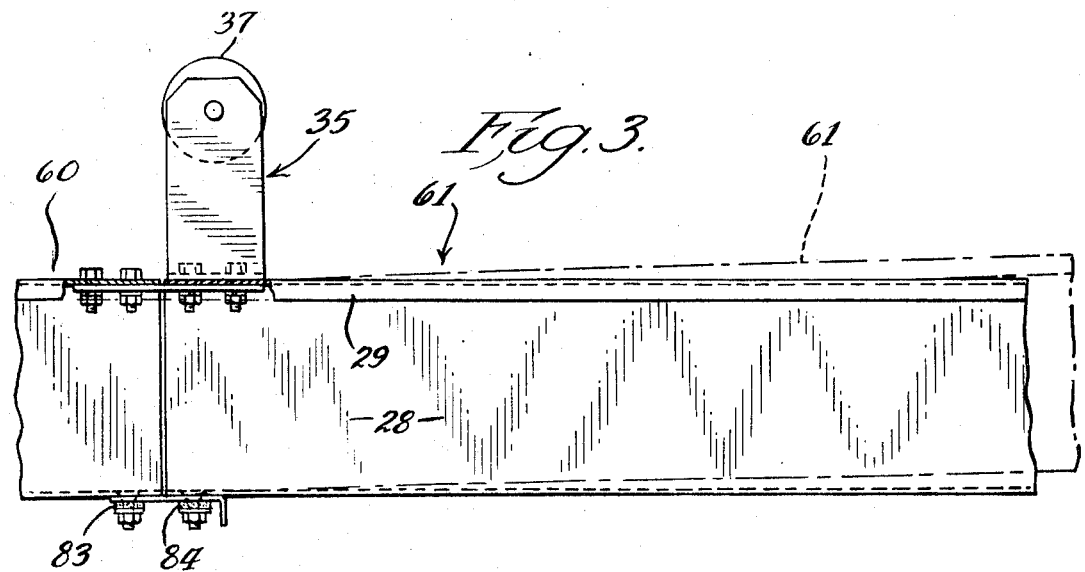
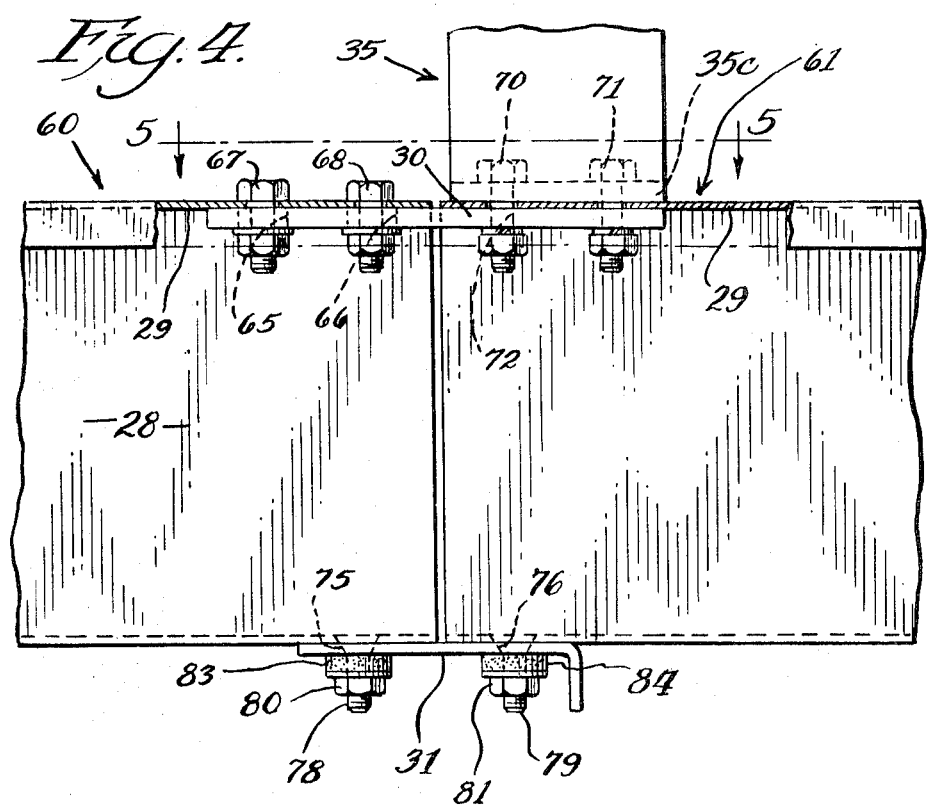

SWEEP SHUTTLE FEEDER

BACKGROUND OF THE PRESENT INVENTION

The present sweep shuttle feeder is of the general type disclosed in the Ferris et al. U.S. Pat. application, Ser. No. 829,993, filed June 3, 1969, assigned to the assignee of the present invention. Generally, the device disclosed in the prior application is a sweep shuttle feeder of the type having a plurality of sweep means on each side of a central feed loading location that act to arrest material in the feed trough as the sweep means pass over the trailing end of the trough, thereby discharging feed materials from the trailing end.

Each of the sweep means provided in the prior application includes not only a sweep panel, provided for discharging the granular materials primarily, but also sweep tines mounted adjacent each of the sweep panels for the purpose of arresting and discharging the denser materials that the sweep panels have a tendency to ride over. The tines dig into the heavier haylage where the sweep panels which have rounded ends have difficulty in so doing.

The reciprocating trough is approximately one-half the length of the feed bunk over which the trough reciprocates, and feed materials are discharged therefrom over one-half the length of the feed bunk on each stroke of the trough across the entire length of the bunk. On the succeeding stroke the sweep shuttle feeder discharges material into the other half of the feed bunk.

For reciprocably mounting the feed trough, a plurality of trolleys are provided on the trough which engage and ride on stationary overhead tracks. While the above described sweep shuttle feeder has been found very successful in many applications, there is a limitation on the length of the tracks and the trough, and thus of the feed bunk, due to difficulties in avoiding vertical and horizontal deviations from straightness in the track and the trough. It is most difficult to avoid vertical deviations over an extended length due to undulations in the feed bunk and the adjacent ground level. Moreover, misalignments obviously will occur as a result of assembling the tracks over a significant length. The same problem of obtaining straightness applies to the trough itself.

Quite clearly, if the trough is out of horizontal alignment with respect to the track some of the trolleys supporting the trough on the track may leave the track, creating an instability in the trough, possibly interfering with the trough supporting structure and possibly even causing the trough to leave the track entirely.

It is a primary object of the present invention to eliminate or minimize the disadvantages of the prior shuttle sweep construction when applied to troughs and feed bunks of great length.

SUMMARY OF THE PRESENT INVENTION

In accordance with the present invention, a sweep shuttle animal feeder is provided of the type generally described above but particularly adapted to compensate for irregularities in the trough supporting structure due to the extended length thereof. The trough is made in a plurality of articulated sections, each with its own trolley riding on a track of the supporting structure, so that the trough can flex or undulate in a vertical plane as it travels down the track.

To provide this articulation between trough sections, a hinge strap is provided at the bottom of the trough interconnecting adjacent sections. The hinge strap is fastened to the sections by resilient washers that permit pivoting one section relative to the adjacent section. For interconnecting the adjacent portions of the trough sections at the tops thereof, an additional strap is provided fastened to the trough sections by bolts, there being provided elongated apertures in the strap for some of the fasteners permitting longitudinal movement of the upper portion of each trough section with respect to the adjacent portion of the adjoining trough section.

Since the trough according to the present invention is articulated, it is undesirable to place the trough under a compressive load since this may have a tendency to cause the trolleys associated with the interior trough sections to leave the track as a result of the trough buckling somewhat. To eliminate this problem there is provided according to the present invention a cable drive connected to each end of the trough and extending outwardly to a source of power for the purpose of pulling the trough in each direction of movement along the feed bunk. Thus, the trough is always in tension and there is no tendency for it to buckle.

BRIEF DESCRIPTION OF THE DRAWINGS

FIG. 1 is a somewhat schematic side elevational view of a sweep shuttle feeder embodying the present invention with parts broken away for clarity and illustration, and with the feed trough and feed bunk partly broken away to reduce the drawing size;

FIG. 3 is a fragmentary side elevational view on an enlarged scale illustrating an interconnection between two trough sections;

FIG. 4 is an enlarged view of FIG. 3 illustrating the hinged joint between two adjacent trough sections; and FIG. 5 is a fragmentary top view taken generally along line 5–5 of FIG. 4, illustrating the upper connection between adjacent trough sections.

DETAILED DESCRIPTION OF THE INVENTION

Figure 2:
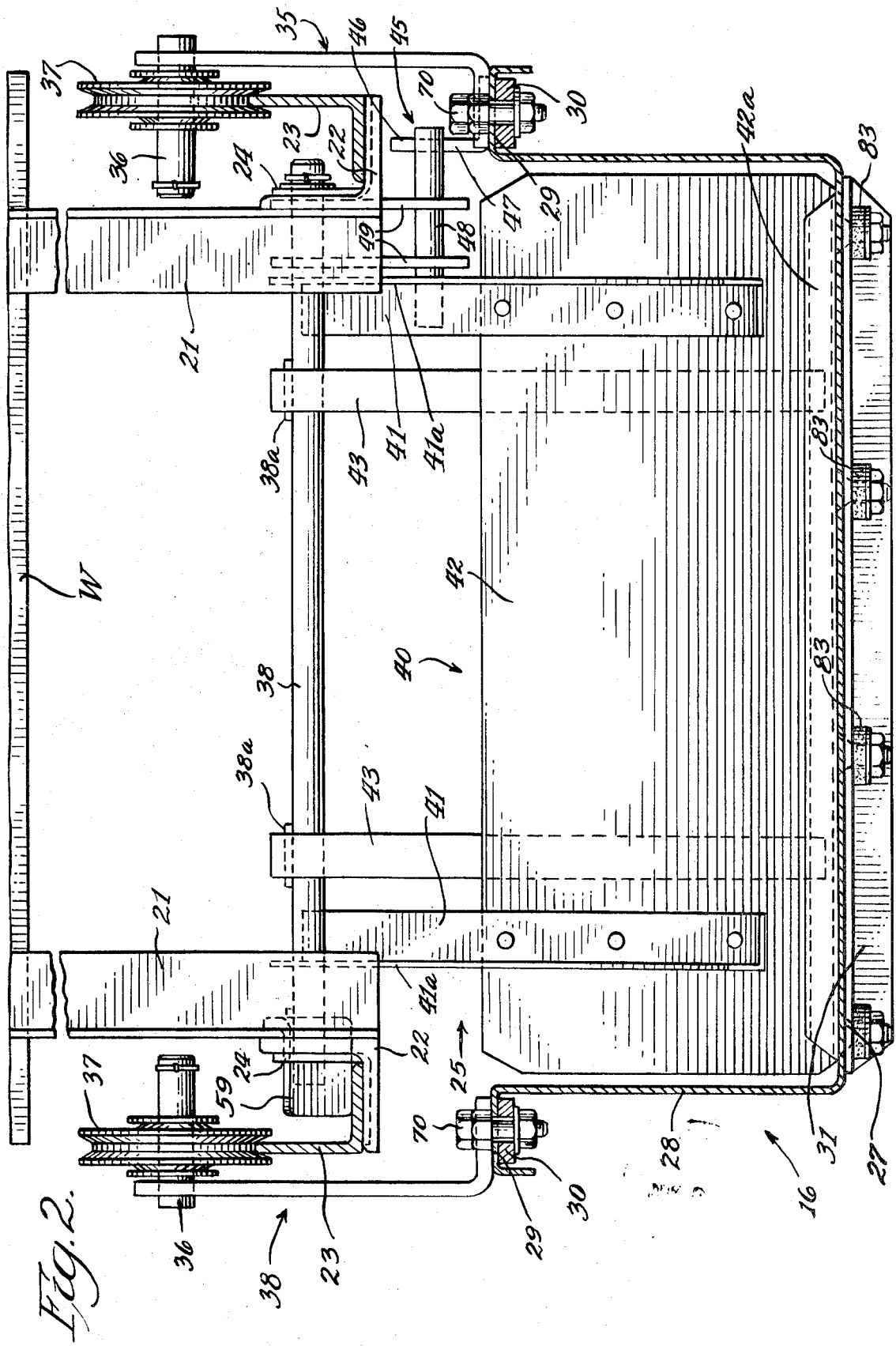
FIG. 2 is a transverse sectional view on an enlarged scale taken substantially as indicated along line 2–2 of FIG. 1.

Referring to the drawings, and particularly FIGS. 1 and 2, the present structure is seen to include a feed bunk B; supporting means indicated generally at 15; a feed trough indicated generally at 16 which is mounted for reciprocating movement on a supporting means above the feed trough; a set of sweep means 17 and a set of sweep means 18 which are on opposite sides of a feed supply station 19; and a drive means 20 for reciprocating the feed trough.

The supporting means 15 includes hangers 21 which may be bolted to any supporting structure such as the rafters of a barn or, in the case of an outdoor feed bunk, a separate wooden framework which includes cross members W carried upon any supporting members desired which may be mounted on the sides of the feed bunk or in the ground along side the feed bunk. As best seen in FIG. 2, at the lower ends of hangers 21 are angle members 22 which support a pair of continuous, parallel rails 23 from which the feed trough 16 is suspended for reciprocating movement. Mounted on the rails 23 at intervals are brackets 24 which are mounted in pairs with the brackets of a pair being transversely aligned with one another with each pair of brackets serving to support sweep means, generally indicated at 25 for the sweep means of the left-hand set 17, and 26 for the sweep means of the right-hand set 18.

The feed trough 16 is an articulated, sectioned sheet metal structure which is generally U-shaped in cross section with each section having a bottom wall 27 and sidewalls 28 which terminate at their upper ends in outwardly extending flanges 29 beneath which are upper splice plates 30 which assist in interconnecting the trough sections.

As seen in FIG. 1 the trough 16 is made up of a plurality of sections as indicated at 60, 61 and 62 in FIG. 1, although it should be understood that more than three trough sections are contemplated in the present construction but that only three have been shown for clarity. More specifically, the present invention can easily accommodate a trough length of 150 feet with each trough section 60, 61 and 62 being approximately 10 feet in length. The present articulated construction of the sections permits total trough lengths more than twice the length of those presently being used.

As seen more clearly in FIGS. 3, 4 and 5 the upper splice plates 30 have two elongated apertures 65 and 66 therein which receive fasteners 67, 68 extending through the trough flange 29. The elongated apertures 65, 66 permit relative longitudinal movement between the splice plate 30 and trough section 60. The splice plate 30 is rigidly connected to the adjacent trough section 61 by fasteners 70 and 71 which extend through the flange 29 associated with section 61 and apertures 72 in the splice plate 30 which are not elongated as apertures 65 and 66. The fasteners 70 and 71 also extend through a flange 35a of a trough mounting bracket 35 for the purpose of securing the mounting bracket to the trough section in a manner so that the bracket mounting does not interfere with articulated movement between the trough sections as permitted by the elongated apertures 65 and 66.

For interconnecting the bottom of adjacent trough sections, an angle splice plate 31 is provided as shown clearly in FIGS. 2 and 4. The splice plate 31 extends across the bottoms of the adjacent floor members 27 and has a plurality of sets of apertures 75 and 76 therein which receive threaded fasteners 78 and 79. The fasteners 78 and 79 include nuts 80 and 81 which are separated from the splice plate by resilient washers 83 and 84. The resilient washers 83 and 84 may be made of a suitable material such as rubber.

Resilient washers 83 and 84 permit the adjacent trough sections to pivot relative to each other about a horizontal axis generally located at the bottom of the trough between sections. This can be viewed by the dotted location of section 61 in FIG. 3. The upper hinge plate 30 allows limited longitudinal motion of the upper adjacent portions of the trough sections and thus accommodates the greater pivotal movement adjacent the lower portions of the trough sections. In this manner each of the trough sections is pivotally connected to the adjacent section and the entire trough assembly 16 is articulated to accommodate flexing or undulating deflections in a vertical plane.

As seen in FIGS. 2 and 3 trough mounting brackets 35 are secured to the flanges 29 by bolts 70, 71, there being provided one pair of opposed brackets 35 for each trough section 60, 61, 62. The brackets 35 carry inwardly extending pins 36 in which are journaled grooved wheels 37 which ride on the tracks 23 to support the trough 16.

The pins 36 have an extended length to accommodate shifting of the wheels 37 with respect thereto and in this manner compensate for a nonparallel relationship between the opposed tracks 23.

The sweep means 25 and 26 are identical, so only one set of sweep means 25 will be described in detail. As seen in FIG. 2 the sweep means of each set 17 and 18 are adapted to swing with respect to the feed supply station 19, so that the sweep means 25 and 26 pivot in opposite directions with respect to the centerline of the unit.

Referring particularly to FIGS. 1 and 2, the sweep means 25 includes a transverse shaft 38 which is pivotally mounted in the brackets 24, and keyed to one end of the shaft is an angle member 39 which limits rotation of the shaft as described in more detail in the above-mentioned Ferris et al. patent application.

Pivotally mounted on the shaft 38 is a panel sweep member, indicated generally at 40, which is formed of a pair of angle members 41, each of which has an apertured web 41a by means of which it is pivoted on the shaft, and a sweep panel 42 which is welded to the angle members 41 and has a rolled lower end 42a.

Also provided are sweep tine means comprising a pair of sweep tines 43 as seen in FIGS. 1 and 2, each of which is substantially channel shaped and engages a key 38a on the shaft 38 and is clamped by means of a bolt and nut (not shown). Thus, the tines 43 pivot only with the shaft 38 and the stop or angle member 39 prevents the tines from swinging past a generally vertical position toward the feed supply means 19.

As best seen in FIG. 1 when the sweep means 25 hangs free, as seen at the left side of the drawing, the upper edge of the sweep panel 42 bears against the tines 43 so that the sweep panel member 40 occupies the position illustrated in the drawings.

The granular feed material which is readily penetrated by the curled end 42a of the sweep panel 40 is arrested thereby and drops off the trailing end of the feed trough 16. With extremely densely packed haylage, however, the sweep panel member 40 may penetrate the material very slightly and merely arrest a rather thin layer of the material near the top, while movement of the mass of the material relative to the trough floor 27 is effected by the action of the tine means 43 which are sufficiently pointed to dig into the mass and hold it.

As seen at the right-hand side of FIG. 2, the means for selectively moving material relative to the trough 16 also includes means generally indicated at 45 for elevating a selected sweep panel member 40 when the leading end of the trough 16 is passing through the set (in this case the set 17) of sweep means which includes the selected sweep panel member. The elevating means 45 includes a cam device 46 which is fabricated from an angle member and mounted upon one of the longitudinal trough flanges 29 so that a web of said angle member which has an inclined face 47 projects into the path of a cam follower pin 48 which is pivotally mounted on shaft 38 by means of bifurcated arm means 49. One end of the pin 48 slides along the cam surface 47 while the other end portion is aligned with one of the angle members 41 of the panel sweep 40. Thus, as the pin 48 rides up the cam surface 47 it is moved into contact with the panel sweep 40 and elevates the latter. When the pin 48 is again clear of the cam member 46 by reason of continued movement of the trough 16 to the left, it pivots clear to the sweep panel angle member so that the sweep panel member is again supported by the floor 27 of the trough. Thus, a small amount of material which is insufficient to lift the sweep panel member 40, is permitted to pass beneath the elevated sweep panel member and be arrested when the sweep panel member is again resting on the floor of the trough with a small quantity of material between the roller end 42 of the panel member and the adjacent end of the trough.

The means 20 for reciprocating the trough includes an electric motor 50 having a shaft on which is mounted a drive pulley 51 which receives a drive belt 52 that is drivingly connected to a first drive pulley 55. Belt 52 also drives belt 56 through shaft 57, and belt 56 drives a second drive pulley 59. An idler pulley is provided adjacent each of the drive pulleys 55 and 59 for receiving the outgoing portions 90 and 91, respectively, of cable 89. The idler pulleys (not shown) are canted slightly from a vertical plane such that the cable can feed off the bottom of the idler pulleys to the top of the drive pulleys without causing climbing or abrasive wear. Thus, the drive unit 20 is constructed to pull cable portion 90, extending over idler pulleys 92 and 93 and interconnected to the left end of the trough at 94, for the purpose of pulling the trough 16 in its leftward direction of movement. To effect the right movement of trough 16 cable portion 91, extending around idler pulleys 95 and 96 and connected at 98 to the right end of the trough 16, is pulled by the cable drive 20.

I claim:

1. A sweep shuttle animal feeder, comprising: frame means adapted to be positioned adjacent a feed bunk; a feed trough supported on said frame means for reciprocating movement along the feed bunk, said feed trough including a plurality of sections each including a bottom wall and upright sidewalls having lower extremities connected to the bottom wall and having upper extremities, and horizontally disposed transverse pivot means interconnecting adjacent trough sections for articulated movement in a vertical plane so the sidewalls at one of said extremities have limited relative longitudinal movement; means for reciprocating said feed trough along said frame means by applying pulling force to the trough substantially in the horizontal plane occupied by the transverse pivot means; and means overlying the trough and resting on the bottom wall thereof for discharging feed from an end of the trough as the trough is reciprocated.

2. A sweep shuttle animal feeder as defined in claim 1, wherein said means for reciprocating the trough includes cable means connected to each end of the trough and extending outwardly from the trough generally parallel thereto.

3. A sweep shuttle animal feeder as defined in claim 2, wherein said reciprocating means includes power means on said frame means, pulley means on said frame means adjacent each end of the feed bunk, said cable means extending around said pulley means and extending to said power means for movement thereof.

4. A sweep shuttle animal feeder as defined in claim 3, wherein said power means is located above said feed trough approximately centrally with respect to said frame means, said pulley means including a pair of vertically spaced pulleys at each end of the frame means.

5. A sweep shuttle animal feeder as defined in claim 1, said interconnecting means including a pivot at one of said extremities of the sidewalls and means interconnecting adjacent trough sections for limited longitudinal movement at the other of said extremities of the sidewalls.

6. A sweep shuttle animal feeder as defined in claim 5 in which the pivot is at the bottom wall.

7. A sweep shuttle animal feeder as defined in claim 6, wherein said means interconnecting said sections for pivotal movement includes at least one hinge strap extending across the bottom of each adjacent trough section, fastener means extending through said hinge strap, and resilient washer means on said fastener means to permit said pivotal movement, said means for interconnecting the adjacent trough sections for limited longitudinal movement including strap means extending across the adjacent trough sections at the upper portions thereof, fastener means interconnecting said strap means and the adjacent trough sections, and elongated apertures in said strap means associated with one of said sections receiving said fastener means and permitting said longitudinal movement.

8. A sweep shuttle animal feeder as defined in claim 1 in which the frame means includes track means, the trough includes wheels rolling on said track means, on transverse axles, and in which said wheels are free to slide along said axles to accommodate to deviations of said track means from a straight line in a horizontal plane.